United States Patent [19]

Von Kohorn

[11] 4,301,121

[45] * Nov. 17, 1981

[54] METHOD FOR LEACHING METAL BEARING ORES

[76] Inventor: Henry Von Kohorn, 22 Perkins Rd., Greenwich, Conn. 06830

[ * ] Notice: The portion of the term of this patent subsequent to Jul. 21, 1998, has been disclaimed.

[21] Appl. No.: 205,878

[22] Filed: Nov. 10, 1980

Related U.S. Application Data

[63] Continuation-in-part of Ser. No. 133,516, Mar. 24, 1980.

[51] Int. Cl.³ ............................................... C22B 3/00
[52] U.S. Cl. ........................................ 423/1; 423/29; 423/658.5; 75/101 R
[58] Field of Search ................... 423/1, 27, 29, 658.5; 299/5, 11; 75/101 R

[56] References Cited

U.S. PATENT DOCUMENTS

| | | | |
|---|---|---|---|
| 3,639,003 | 2/1972 | Spedden | 299/5 |
| 3,809,430 | 5/1974 | Michaelson | 423/27 |
| 3,834,760 | 9/1974 | Spedden | 299/5 |
| 3,840,365 | 10/1974 | Hammes | 423/27 |
| 4,017,309 | 4/1977 | Johnson | 75/101 R |
| 4,091,070 | 5/1978 | Riggs | 423/41 |

*Primary Examiner*—Brian E. Hearn
*Attorney, Agent, or Firm*—Ralabate, Perman & Green

[57] ABSTRACT

Disclosed is a method for above-ground leaching of metal bearing ores comprising (a) providing an ore body to be leached having positioned therein void-creating members, said members being positioned substantially vertical or at an angle to the horizontal plane in order that they are capable of being pulled out of said ore body in a substantially upward direction; (b) partially performing the leaching; (c) removing said members by pulling out in a substantially upward direction, thereby creating internal voids and causing shifting of ore in said ore body; and (d) completing the leaching.

41 Claims, No Drawings

METHOD FOR LEACHING METAL BEARING ORES

RELATED APPLICATIONS

This application is a continuation-in-part of co-pending application, Ser. No. 133,516 filed Mar. 24, 1980.

BACKGROUND OF THE DISCLOSURE

I. Field of the Invention

This invention relates, in general, to a method for the improved recovery of metal from ore by heap leaching and, more specifically, to an improved method employed especially where the heaps are relatively wide or closely spaced to one another.

II. Description of the Prior Art

Hydrometallurgical work done during the last two decades have included efforts to separate metals, for example gold and silver, from gangue material or host rock, by leaching with a solvent, such as cyanide solutions. Much of the early work was done by the Reno Metallurgy Research Center of the U.S. Bureau of Mines in Reno, Nevada. This is further explained in a paper entitled "Silver Extraction from Marginal Resources" by H. J. Heinen, D. G. Peterson and R. E. Lindstrom, delivered at the annual meeting of the American Institute of Mining, Metallurgical & Petroleum Engineers, in New York City, New York on Feb. 16, 1975.

In the extraction of metals from metal-bearing ore by leaching, the recovery of metals is generally far inferior to the recovery rates achieved by other known methods, for example roasting and flotation. One reason for this inferior recovery is the inability to efficiently heap leach rock which has been finely ground since the leaching solution cannot satisfactorily filter through the densely packed ore particles. On the other hand, leaching ore crushed to a size common to heap leaching, for example about two to five centimeters, results in poor and uneven penetration of the leaching solution into the crushed ore. This inferior penetration is due in part to the larger size of the crushed ore pieces as well as to the stationary position of the crushed ore.

In heap leaching, the leaching solution will normally pursue a downward path of least resistance through the rock pile or heap. This phenomenon is known as channeling and results in uneven leaching action. It is possible, for the purpose of improving recovery, to rearrange the ore and divert channeling by setting off small explosive charges within the leach pile. This approach, however, has the drawback of producing fines, i.e., small rock particles which are densely packed and impair the filtering down of the leaching solution.

In co-pending application, Ser. No. 133,516 there is described an improved method of leaching metal bearing ores, wherein removable, void-forming members are placed near the bottom of the ore body and removed during the leaching process, causing partial internal collapse and shifting of the ore, thus exposing additional ore surfaces to the effect of the leaching solution. While this process has many advantages, it also has certain limitations. For example, in certain instances where ore bodies to be heap leached are relatively wide or closely spaced, it may be difficult, if not impossible, to pull the void-creating members out in a substantially horizontal direction towards the sides of the heap. This is the case when the heap or ore body is either continually widened by adding ore to its sides or where the width of the heap is such that the void-creating members have to be so long that the friction to be overcome in pulling them out would be excessive. It is also the case where the heaps are so closely spaced that there is insufficient room between neighboring heaps to pull void-creating members out in a substantially horizontal direction.

It is, therefore, an object of the present invention to provide a method for leaching metal bearing ores which is devoid of the above-noted disadvantages.

It is another object of this invention to provide a method for leaching metal bearing ores wherein improved distribution and percolation of the leaching material through the ore body is achieved.

It is still another object of this invention to provide a method for leaching metal bearing ores wherein void-creating members may be used in conjunction with relatively wide or closely spaced heaps of ore.

It is another object of the present invention to provide a method for leaching metal bearing ores wherein pulling out of the void-creating members is made easier.

It is a further object of this invention to provide a method for leaching metal bearing ores wherein void-creating members, such as pipes, can be limited to a length which does not result in friction with the ore which cannot be overcome by standard earth moving equipment.

It is yet another object of the present invention to provide a method for leaching metal bearing ores wherein the void-creating members can be pulled out in an upward direction by standard earth moving equipment.

It is still another further object of this invention to provide a method for leaching metal bearing ores wherein the ore near the bottom of the heap, which is packed more densely and which is affected more by the channeling effect that the ore near the top of the heap, comes in contact with a greater proportion of the leaching solution used.

It is still another object of this invention to provide a method for leaching metal bearing ore wherein a greater proportion of leaching solution, not weakened in its ability to dissolve additional metal by first filtering through the top portion of the heap, reaches the ore nearer to the bottom of the heap.

It is yet a further object of this invention to provide a method for leaching metal bearing ore wherein void-creating members having thinner walls are employed.

SUMMARY OF THE INVENTION

The foregoing objects and others are accomplished in accordance with this invention, generally speaking, by providing a method for above-ground leaching of metal bearing ores comprising (a) providing an ore body to be leached having positioned therein void-creating members, said members being positioned substantially vertical or at an angle to the horizontal plane in order that they are capable of being pulled out of said ore body in a substantially upward direction; (b) partially performing the leaching; (c) removing said members by pulling out in a substantially upward direction, thereby creating internal voids and causing internal shifting of ore in said ore body; and (d) completing the leaching.

In those cases where it is impractical to remove the void-creating members by pulling them out towards the sides of the heaps, the objectives of the invention may be achieved by pulling them out in a substantially upward direction. Leach piles may have a height of approximately five to ten meters so that void-creating members, such as pipes, may be limited to a length which does not result in friction with the ore which cannot be overcome by standard earth moving or construction equipment, such as, for example, hoists.

Perforations may be present in the walls of the members, particularly in their lower portions, in order that ore at the bottom of the heap, which is packed more densely and which is affected more by the channeling effect than the ore near the top of the heap, comes in contact with a greater proportion of leaching solution used. Moreover, by using pipes perforated in its lower portion, the leaching solution coming in contact with the ore near the bottom of the heap will not be weakened by ore first dissolved in it nearer the top of the heap.

DETAILED DESCRIPTION OF THE INVENTION

According to the present invention, void-creating members are positioned in an ore body substantially vertical or at an angle to the horizontal plane in order that they may be pulled out in a substantially upward direction by standard earth moving or construction equipment.

The void-creating members may have cross-sections with a rounded configuration such as cylindrical shapes. Closed hollow cylinders or pipes, are particularly well suited for this purpose. These pipes, or the like, may be made of any suitable material which is not corroded by the leaching solution. In the case of leaching ores containing gold or silver, for example, the leaching material may be a cyanide solution and the pipes may comprise steel or concrete. In the case of pipes, wall thicknesses are chosen in order that, depending on their diameter, the lateral pressure of the surrounding ore in the heap will not crush the pipes. The pipes may have perforations as hereinafter described.

Cylindrical void-creating members, such as pipes, must be supported at least during the initial phase of constructing a heap, unless they have such a wide configuration at the lower ends resting on the leach pad or on an ore layer that they will not topple while the ore dumped off trucks or delivered by conveyors is stacked, i.e. deposited against and around them. For example, a pipe with a two meter diameter when placed in an upright position on a leach pad or on a smooth ore layer, will not be knocked over by ore, crushed to two centimeters, dumped against the pipes from trucks or conveyors in building the heap. Of course, once a pipe is partially embedded in the ore, even a smaller diameter pipe will retain its upright position.

Depending on the character of the ore, the diameter of the void-creating members, such as pipes, inserted in the ore body in an essentially vertical position, is chosen with due regard to their center of gravity, which in turn is determined by its length. The objective is to be able to put the pipe section in place, the cross-section of the lower ends being such that the pipe has adequate stability to withstand without support and without toppling the force of the ore deposited, dumped or stacked against the pipes. The weight, for instance, of a steel pipe with a two meter diameter is such that ore thrown against its base will not topple an upright 10-meter section. Once sufficient ore has been deposited to partially embed the pipe, its resistance to falling over of course increases.

According to one embodiment of the present invention, the pipes are inserted in the ore body by suspending them in place individually from a hoist, crane or other suitable equipment. The pipes may hang from a hoist or they may be gripped and held in place vertically by machinery equipped with a clamping mechanism. The hoist or other machinery may be resting on the ground or on the ore body. The pipes are thus held in the desired place while ore is delivered and stacked against them by conveyors or trucks during the construction of the pile, at least until the surrounding ore lends them adequate stability without further support. Alternatively, the pipes may be suspended from a hoist or other holding mechanism in a substantially vertical position or at an acute angle to the vertical plane, the lower end touching or near the ground. Ore is then deposited around the pipes until the ore reaches such height as to hold the pipes in place without support in the chosen position, at which point the pipe is detached from the holding mechanism. Still another method for positioning the pipes in the ore is to simultaneously suspend two or more pipes from a crane equipped with a suitable device, such as a steel bar, capable of engaging and holding in place a plurality of suitably equipped pipes, while the ore is being deposited around and between them. The ore may be stacked by trucks or conveyors around and between the pipes. In another embodiment, void-creating cylinders, such as pipes, are positioned and distributed over a desired ground area of the leaching pad before any ore is delivered and deposited thereon. The pipes are substantially vertically held in place by connecting means near their upper ends or by attaching them to neighboring pipes by suitable rigid or loose means so that the pipes distributed over a given ground area hold each other up and are thus prevented from toppling. In this case the connecting or attaching means, which determine the spacing between neighboring pipes, are made of a material or a combination of materials in which at least one essential component is corroded by the leaching material. As a consequence, upon partial performance of the leaching, the integrity of said connecting or attaching means is destroyed and the attachment to each other of neighboring pipes ceases. The connecting means thus will not impede the pulling out of the pipes after the leaching process has been partially performed. For example, in the case of cyanide leaching, vertical steel pipes having open upper end, may be held in place on a previously deposited layer of metal bearing ore by positioning them and holding them in substantially vertical position and in the desired spaced horizontal relationship by connecting them with copper or brass rods may, for example, be bent at their ends so as to the upper walls of or perforations in the pipes and may be made entirely out of a copper-containing alloy or may comprise a copper containing component which is corroded by the leaching solution. The integrity of the connecting rods is destroyed during the leaching and the pipes, which thus become disconnected, may then easily be pulled out in a substantially upward direction. Connecting means, other than those specifically cited herein, may, of course, be used.

When the construction of the ore body has been completed, the void-creating members normally extend to and preferably protrude from the top of the heap, the latter embodiment serving not only to facilitate attaching them to a hoist for pulling out but also serving the purpose of preventing crushed ore from falling into the open upper ends of the pipes during the construction of the ore body. The falling of ore into the open ended pipes during the building of the pile can also be prevented by providing temporary and removable covers on said pipes during the building of the pile, said covers being removed if and when it is desired to feed leaching solution into perforated pipes. The pulling out of the cylinders or pipes may be facilitated by providing tapered void-creating members, the diameters of these cylinders or void-creating members being smaller near their lower ends than near their upper ends.

When using a leaching agent which does not corrode the material of which the void-creating members are made, said members may be comprised of other suitable materials including metals and plastics.

In yet another embodiment, void-creating members may have triangular, square or rectangular cross-sections. In such cases, these members are fabricated of flat sheets. The flat sheets may be of rectangular configuration or slightly wedge-shaped or pie-shaped. In the latter cases, the members will be tapered, the ends with the larger cross-sectional area being positioned near the top of the completed heap.

The use of pipes in a substantially vertical position or in an angle to the horizontal plane has the additional advantage that such pipes, when perforated, can be used to achieve additional distribution of the leaching solution, particularly in the lower strata of the ore body. Channeling and mor dense packing of ore has been found to become more pronounced and therefore more harmful in the lower layers or strata of leached ore bodies. By introducing leach liquor through wall perforations of the pipes directly into the lower layers of ore bodies through hydrostatic pressure tends to counteract channeling and dense packing in such lower ore strata. This method also has the advantage of permitting, if desired, the delivery of barren or less enriched leach liquor directly to the lower strata of the ore body which normally are contacted only by leach liquor partially enriched by percolating through the upper strata of the ore body. This method increases the effectiveness of the leaching process in the lower parts of the ore body. Maximum flow of leaching solution into and through the lower strata of the ore body can be obtained by providing smaller holes near the bottom of the pipes than near their upper end, as this will increase the amount of leach liquor and the static head in the pipes. Normally, the pipes will be closed at or near their lower end in order to prevent the discharge of most of the leach liquor through the lower opening and in order to force the leach liquor to be discharged in a radial direction through the wall perforation in the pipes. The closed ends of the pipes may, however, be perforated to ensure leaching of ore directly below the pipes. In this connection it is important to note that the positioning on pipes open at the top at any angle which will make them extend from the top of the completed pile to or near the lower portions of the pile will create a hydrostatic pressure and force the leach liquor into the ore body at the levels in the pipe at which the perforations are located.

Pipes may have openings near their upper ends designed to receive leach liquor and these openings may not correspond to the total upper diameter of the pipes. According to other modifications, pipes which extend from the top of the pile to a lower position but not to the bottom of the pile may be closed at their lower ends but may have perforation in said lower ends or end plates. Perforated pipes which have closed, but perforated, lower end plates may have unperforated extensions of their walls below said end plates; the end plates in effect become partitions within the pipes, the walls above the partition being perforated and the walls below being unperforated. Depending on the character of the ore to be leached, and if it is desired to modify the amount of or the concentration of the leach liquor delivered directly to the lower layers of the ore body, the concentration or the volume of leach liquor delivered through the perforated pipes may be adjusted so as to obtain optimum extraction of metals.

In heap leaching, as the leach liquor filters down through the metal bearing ore, it tends to become richer in extracted metals. Further, as it reaches the lower levels of the ore body, the leaching agent is depleted, the rate of extraction becomes lower and the efficiency of the process becomes less. It is possible to counteract this phenomenon by increasing the volume of leach liquor brought to bear upon the lower strata of the ore body. This is done by supplying additional and/or a stronger leach to the perforated pipes and introducing it into the lower layers of the heap through the hydrostatically induced radial flow through the wall openings.

Depending on the nature of the ore to be leached, it is necessary to adjust the amount of or the concentration of leach liquor delivered directly to the lower layers of the ore body. The position and size of the holes in the pipe walls also determine the volume of leach liquor delivered into and through the perforated pipes. All of these factors must be adjusted on an empirical basis in order to obtain optimum extraction of metals.

According to yet another embodiment, pipes may be provided which rest on or near the bottom of the leach pad. Said pipes may have a partition located at a distance from their lower ends equal to $\frac{1}{8}$ to $\frac{1}{2}$ of the distance between the leach pad and the top of the ore body. The sections of the pipes above said partitions are perforated. The sections below the partitions are not perforated. The partitions themselves may or may not be perforated. All of these modifications and adjustments, including optimum specifications, as well as the diameter of the holes in the pipe walls, are subject to empirical determination.

Depending on the character of the ore, it may be desirable to start constructing the ore body by laying down or deposition a layer of ore and then placing the pipes described herein on top of said ore in the manner described. This layer of ore may be relatively thin (e.g. 0.2 meters) or thick (e.g. about five meters) which would be the case if a second leach pile is constructed on top of a previously leached 5 meter high pile.

The pipes need not all be inserted at precisely the same angle, provided they are positioned so that they can be pulled out in an upward direction. The holes in the pipe walls may be used to attach the pipes to each other or to the hoist mechanism, or the pipes may be provided with other means to engage the equipment which pulls them out. In cases where the ore is dumped on the leach pad and on the pile under construction from such a height that there is danger that the ore will fall into the pipes and fill them up, the open ended pipes may be closed by suitable removable covers during the construction of the pile. These covers or lids are removed when the pile is completed and leach liquor can be fed into the pipes at their open upper ends or through other connections. The covers can be reused on other pipes during the construction of the pile; the relatively short period of use on any one pipe therefore significantly reduces the total required number of these removable and reusable covers. The pipes themselves, being of a material which essentially or completely resists corrosion by the leach liquor, are reusable and their cost can therefore normally be amortized over many leaching cycles performed on newly constructed ore bodies.

It obviously is not as desirable to use pipes open at their lower ends which reach to and rest on the bottom of the pile since the leach liquor would drain away fairly rapidly without contacting a significant amount of ore. Pipes with open lower ends may be used provided they are tapered at their lower open end so as to throttle the flow of the leach liquor. Such pipes with tapered lower open ends, with other forms of constricted lower openings or with closed but perforated lower ends, may extend from the top of the pile part way but should not extend all the way to the leach pad for best results to be obtained.

As described in co-pending application, Ser. No. 133,516 the pipes may be removed in sets at different intervals. This is particularly useful in the case of pipes inserted at an acute angle from the vertical, as in this manner two or more discrete pipe sections may be located vertically above each other separated by layers of ore. For example, a plurality of pipes positioned over a given ground area may be divided into three sets, each set being similarly and evenly distributed over the entire said ground area. After one quarter of the total leaching cycle has taken place, one set or one third of the pipes may be pulled out, resulting in some collapsing and lateral shifting of ore. After one half the leaching cycle has taken place, a second set or one additional third of the original pipes may be pulled out. After three quarters of the leaching cycle has passed, a third set or the remainder of the pipes may be pulled out. Each of said steps of removing one third of the pipes creates internal movement of the ore. This leaching method produces a great deal of lateral movement of ore, opening up and exposing large additional ore surface to the leach liquor.

It is obvious that the disturbance of the core created by the present method is much more widespread throughout the ore body than for instance the disturbance of ore brought about by such known methods as ripping. Mechanical rippers of leach piles are not only expensive to operate and subject to frequent breakdowns, but are by necessity narrow and therefore much more limited in scope and effect than the much larger void-creating members described herein.

The diameter of the pipes, their length, spacing and possible wall perforations in the case of open pipes are best determined empirically. For example, a total volume of the inserted pipes, i.e., the combined void left behind after pulling out the pipes in an upward direction of 10% of the total volume of the ore body, will produce a reduction of approximately 10% in the overall height of the heap with attendent internal rotation and movement of the ore pieces. It is not necessary for the ore pieces to drop; a lateral movement resulting in a shift, rotation or slight separation of ore pieces will produce the same results as a vertical collapsing of the ore.

Placing the pipes in an essential vertically position or at an angle to the horizontal plane has the additional advantage of being able to utilize pipes with inner walls, because the pressure of the ore in the body of the pipes is lateral in contrast to the case where the pipes are positioned horizontally and therefore must support the weight of the ore above them. The void-creating members may be provided with internal struts so as to be able to reduce the thickness of their walls.

Because channeling is a major drawback of heap leaching, the present invention is particularly useful in that it counteracts channeling in three distinct ways. One of the above-described movement of ore brought about by pulling the void-creating members out of the ore body in one step or in several partial steps. The second is the outward discharge of leaching solution fed into said members near their upper ends through the perforations in the walls of the hollow members at different levels of the ore body. The third is the change in the directions in which the leaching solution is outwardly discharged through the plurality of perforations, which change in directions can be achieved by rotating cylindrical members during leaching. The cylindrical void-creating members may be rotated once or more often during leaching cycle before being pulled out. The step of rotating the void-creating, cylindrical members at least once during leaching serves not only to counteract channeling but also exposes additional ore surfaces to the action of the leaching solution.

Rotation of the cylindrical members, such as pipes, may be of as little as ten degrees to be effective, but can be more. Rotation of a pipe can be performed by any common mechanical means; for instance, a bar having a length greater than the pipe diameter is placed diametrically across the top of the pipe in cutouts provided therefor in each pipe, so that the bar engages the pipe and protrudes at least on one side of the pipe. Machinery not attached or permanently connected to said bar, such as a vehicle or any earth moving or construction equipment may be used to push one protrusion of the bar, thus rotating the pipe at an angle sufficient to accomplish the stated objective.

The following embodiment has the advantage of not requiring the pulling out of void-creating members and using flat sheets rather than more complex members. A layer of crushed ore or granules is deposited on the leach pad in such a manner as to form a plurality of peaks and/or ridges. For instance, the ore layer may be 0.25 meters high and the peaks and ridges may protrude therefrom another 0.5 meters, the exact height not being of importance. A plurality of perforated sheets is then laid down over the ore layer next to each other, each sheet being supported by two or more of the peaks and/or ridges. The perforations permit the leaching solution, but not the crushed ore pieces, to pass through them. The rigid sheets may be of metal or plastic and are strong enough to support the weight of the ore which is then deposited on them. The sheet material, wholly or in part, or components integrated into such sheets, are subject to corrosion by the specific leaching solution. employed. The sheets do not have to abut, but cover all or most of the area covered by the ore layer. Provided the sheets are large enough to extend to their supporting peaks or ridges, the spacing of the peaks and ridges is not important. When the construction of the ore body has been completed, void spaces exist below the sheets between the peaks and ridges. Leaching is then performed, the solution gradually corroding the sheet material, until the structural integrity of the sheets has been impaired to such an extent that the sheets break up under the weight of the ore. The ore pieces above and near the voids fill the void spaces, rotating and shifting in the process. The sheets may be designed to break up in stages, causing repeated disturbances of the ore. The leaching which is continued during these events, is then carried to completion.

The rigid perforated sheets may comprise one or more layers of a single material having varying thicknesses across their areas or they may comprise two or more materials or components. The different components or parts of such composite sheets are corroded by the leaching solution at different rates and break up in stages, causing several chronologically separated movements of ore.

According to yet another embodiment, rigid perforated sheets, intended to carry all or most of the ore to be leached and strong enough to do so, are placed on support members resting on the leach pad or on a layer or ore previously deposited on the leach pads. Voids are thereby formed between the sheets and the leach pad or the said ore layer. The perforations in the sheets permit the leach liquor, but not crushed ore or nominal size to pass through them. The support members determine the height of the voids, i.e., the desired space between the sheets and the surface on which the support members rest. The support members may for instance comprise uprights of sufficient strength to support, prior to leaching, the weight of the sheets and the ore on said sheets. The rigid spacing support members are made of or comprise a material which is corroded by the leach liquor; they are designed so that their integrity is impaired at such a rate by the leach liquor that after partial leaching has taken place, they will collapse or break up so that the sheets bearing the ore will tilt or drop into the void space below them. The chosen rate of corrosion of the support members is such as to bring about the collapse or breaking up of the support members after the desired partial leaching has taken place. The material subject to corrosion may for instance be the joints or other components of the support system, such as a pin horizontally inserted through the said uprights which protrude through holes in said sheets, the sheets resting on said corrodible pins. As individual pins corrode and break, the ore-bearing sheets will no longer be supported at that point and the resulting tilt of the sheets will cause the ore to slide, eventually filling all of the void space. The ore immediately affected by sliding off tilted sheets or indirectly affected by moving in response to reduced pressure resulting from the shifting of neighboring ore, will present new surfaces to the precolating leaching solution or open up new surfaces to capillary action.

The following examples will further define various preferred embodiments of the present invention.

EXAMPLE I

The invention is practiced on gold and silver bearing ores in the following manner: Steel pipes with a diameter of two meters are cut into sections having a length approximately equal to or slightly exceeding the intended height of the leach pile to be constructed. The pipe sections are closed at both ends by welding circular sheet steel end pieces to them. The resulting hollow cylinders have a wall thickness of about five to eight millimeters. They are provided with engaging means to attach a hoist near their upper ends.

A plurality of such cylindrical, void-creating members is place on a vacant leach pad in approximately vertical attitude and in horizontally spaced relationship of about five meters between pipes, so as to allow sufficient room between the cylinders for an ore conveyor or truck. The ore has been crushed to a nominal size of two centimeters and is deposited by trucks or conveyors on the pads around or between the cylinders. The stability of the cylinders due to their large diameter prevents them from toppling as the ore is stacked against them.

Cyanide leaching is then commenced by sprinkling leach liquor on the entire ore body. After one third of the leaching process is performed, the cylinders are pulled out upwardly to the extent of half their length by cranes or hoists resting on the heap or on the ground alongside the ore body. The ore in the heap thereupon fills the voids created, resulting in movement and separation of the ore particles and in the opening up of new ore surfaces and fissures to the action of the leach liquor. After another one third of the leaching is performed, the cylinders are completely pulled out in an upward direction. The new voids created will cause more ore to rotate or shift slightly. The leach cycle is then completed. The repeated effect of rotating or shifting ore so as to open up new surfaces and fissures to the leach liquor is, in the case of the above mentioned dimensions, a very pronounced one. Given a cylinder diameter of two meters and a spacing of five meters between cylinders, the movement, including the disturbing "halo" effect created by pulling out the void-creating cylinders, affects virtually all of the ore particles in the ore body.

EXAMPLE II

The method of Example I is followed with the following modifications: The steel pipes resting on the leach pad are open at both ends, but are divided by means of a partition located in the lower half of the pipe. The pipe walls are perforated above the partition and the partition itself is slightly perforated. The wall section below the partition is not perforated. It is important however to prevent the free and uncontrolled flow of the leach solution directly from the top to the bottom of the pipe and the perforated partition act as a throttle. Leach liquor is fed into the pipe at the top and discharged by hydrostatic pressure primarily through the perforations in the pipe walls and somewhat through the partition. The rate of flow is primarily determined by the size of the perforations at different pipe levels, the total volume of leach liquor fed into the pipes being empirically determined to give optimum overall results.

In the case of Example 2, the leach liquor discharged through the walls of the pipes produces a more uniform and effective leaching action inside the ore body. To some extent this is by virtue of the fact that, depending on the hydrostatic pressure, the leach liquor spreads laterally from said walls, reaching ore surfaces previously inaccessible to the leach liquor.

The steel pipes have a cut-out at their upper ends into which a removable steel bar can be placed, said steel bar having a length greater than the diameter of the pipes. During the leach cycle the steel pipes are slightly rotated 20 degrees at least once by pushing one end of the protruding bar with a vehicle or other means of exerting the necessary thrust. This rotation directs the leaching solution discharged from the wall openings towards new ore surfaces and increases its effect.

EXAMPLE III

The method of Example II is followed with the following modifications: A layer of the ore to be leached is deposited on the leach pad and the void-creating pipes with a diameter of two meters are cut into sections long enough so as to protrude from the top of the completed pile when placed on this strata of ore previously laid down. The steel pipes are open at the top and have closed lower end pieces with perforations. The flow of leach liquor fed into the pipes from the top, is determined by the size and number of holes in the walls of the pipes, and in the lower end pieces. In this manner the desired volume of leaching solution is delivered directly to the lower portion of the ore body. At the same time the pipe sections are shortened and the friction between the ore and the pipes is reduced.

EXAMPLE IV

Two steel pipes perforated in the manner described are used, one having a diameter of two meters and one having a diameter of 1.5 meters. The pipe with the smaller diameter is inserted into the pipe with the larger diameter before or after one of the pipes has been placed into position in an essentially vertical attitude. Leaching is commenced and after one fifth of the leaching has been performed the outer pipe is pulled out by one half of its length. After another one fifth of the leaching has been performed the outer pipe is pulled out completely in an upward direction. Leaching continues for another one fifth of the cycle and then the remaining pipe with a diameter of 1.5 meters is pulled out by one half of its length in an upwardly direction. Leaching continues for another one fifth of the cycle and the remaining pipe is then pulled out completely, whereupon leaching is completed.

In the manner described above five separate and distinct, although slight, movements of ore in the ore body take place, each making more ore surfaces accessible to the leach liquor and each movement counteracting channeling.

EXAMPLE V

The pipes described in the forgoing examples are provided with outwardly flaring upper ends and three equally spaced holes are provided in said flaring portion of the upper pipe ends. According to a simple embodiment, three steel rods with tapered upped ends are inserted into said holes, the diameter of said rods being such that only the upper tapered ends will pass through the said holes. The lower ends of said three rods are spread out in the manner of a tripod. This three-legged support prevents the pipe from toppling. When leaching has taken place and the pipe is pulled out upwardly the supporting members will slide out of the holes and remain in the ore pile as the pipe is removed. Other more elaborate types of support members may of course be designed by persons skilled in the art. For example, the support members may also be perforated pipes and may have inlets for leaching solution.

While specific components of the present system are defined in the working examples above, any of the other typical materials may be substituted in the working examples, if appropriate. In addition, many other variables may be introduced into the present process which may in any way affect, enhance or otherwise improve said process.

While variations are given in the present application, many modifications and ramifications will occur to those skilled in the art upon reading the present disclosed. These are intended to be included herein.

What is claimed is:

1. A method for above-ground leaching of metal bearing ores which comprises:

(a) providing an ore body to be leached having positioned therein void-creating members, said members being positioned substantially vertical or at an angle to the horizontal plane in order that they are capable of being pulled out of said ore body in a substantially upward direction;

(b) partially performing the leaching;

(c) removing said members by pulling out in a substantially upward direction, thereby creating internal voids and causing shifting of ore in said ore body; and (d) completing the leaching.

2. The method of claim 1 wherein a layer of metal bearing ore is first deposited on a leach pad and wherein construction of the ore body is then completed, said ore body having placed therein in a horizontally spaced relationship a plurality of void-creating members, said members resting on said ore body substantially vertical or at an angle to the horizontal plane in order that they are capable of being pulled out of said ore body in a substantially upward direction.

3. The method of claim 1 wherein the cross-sections of said void-creating members have a rounded configuration.

4. The method of claim 1 wherein said void-creating members have a substantially cylindrical shape.

5. The method of claim 4 wherein the diameter of the cylindrical void-creating members is sufficiently large to give said members sufficient stability unsupportedly to withstand the piling up of ore against and between them without toppling.

6. The method of claim 1 wherein said void-creating membershave triangular, square or rectangular cross-sections.

7. The method of claim 1 wherein said void-creating members are provided with internal struts.

8. The method of claim 1 wherein said void-creating members are positioned in said ore body by holding them in place during construction of said ore body.

9. The method of claim 1 wherein said void-creating members extend to or protrude from the top of said ore body during leaching.

10. The method of claim 1 wherein said void-creating members are upwardly pulled out by hoists.

11. The method of claim 1 wherein said void-creating members are open-ended pipes.

12. The method of claim 1 wherein said void-creating members are closed hollow cylinders.

13. The method of claim 1 wherein said void-creating members are tapered, having a smaller cross-section nearer their lower end than near their upper end.

14. The method of claim 1 wherein at least a portion of said void-creating members have perforations along at least a portion of their length.

15. The method of claim 14 wherein the cross sections of said perforations are larger near the upper end of said void-creating members.

16. The method of claim 14 wherein said perforations are along the lower portion of the length of the void-creating member.

17. The method of claim 14 wherein the lower ends of said void-creating members are closed.

18. The method of claim 17 wherein said members are hollow.

19. The method of claim 17 wherein the closed lower ends have perforations.

20. The method of claim 19 wherein the perforated pipes and their perforated lower ends are raised above the leach pad by unperforated downward extensions of the pipe walls.

21. The method of claim 19 wherein said perforations are smaller than the nominal size of the crushed ore particles used in constructing the ore body.

22. The method of claim 14 wherein the size of sid perforations progressively increases upwardly from the lower end of said pipes.

23. The method of claim 1 wherein said void-creating members are closed at their upper ends by removable covers during construction of said ore body.

24. The method of claim 1 wherein said void-creating members are provided with means to engage hoisting means for pulling out.

25. The method of claim 1 wherein the upper ends of said void-creating members are open and wherein leaching is partially performed by feeding leach liquor into said upper ends.

26. The method of claim 1 wherein ore is stacked around and between said void-creating members to construct an ore body.

27. The method of claim 1 wherein said void-creating members are substantially cylindrical elongated pipes.

28. The method of claim 1 wherein said void-creating members are in a horizontally spaced relationship to one another.

29. The method of claim 1 wherein a layer of metal bearing ore is deposited on a leach pad; said void-creating members are positioned on said layer in a horizontally spaced relationship; and construction of the ore body is completed by stacking additional ore against and between said members.

30. The method of claim 29 wherein said layer of metal bearing ore has a depth equal to about ⅛ to about ½ of the height of the completed ore body.

31. The method of claim 1 wherein the void-creating members are positioned in the ore by simultaneously suspending two or more members from a crane, equipped with a device capable of engaging and holding in place a plurality of members, while ore is being deposited around and between them.

32. The method of claim 1 wherein said void-creating members are held in a horizontal spaced relationship to each other by connecting means, the integrity of said means being destroyed upon partial leaching.

33. The method of claim 1 wherein the void-creating members are rotated one or more times during the leaching cycle before being pulled out.

34. The method of claim 1 wherein each of said void-creating members is held in place during the construction of the heap by a plurality of rigid, elongated support members; each of the support members is longer than the void-creating member; the upper ends of the support members are detachably attached to the upper ends of the void-creating members; the lower ends of the support members are spread outwardly from the void-creating members to create a multi-leg support base for each void-creating member; the void-creating members and support members automatically detach from each other when the void-creating member is pulled out; and the support members remain in the leach pile after the void-creating members have been pulled out.

35. The method of claim 34 wherein the support members are perforated pipes and during the leaching are charged with leaching solution at their upper ends.

36. The method of claim 1 wherein said void-creating members are pulled out in at least two partial, chronologically separated steps.

37. A method for the extraction and recovery of metals from ores by above-ground leaching comprising:
1. providing a plurality of sets of removable void-creating members inserted in the ore body to be leached, wherein:
   a. each set of said members comprises at least two hollow, elongated members of which a first inner member having a smaller cross-section has been inserted into a second outer member having a larger cross-section,
   b. a void space is created between said inner and outer members, and
   c. said sets of members are positioned in the ore body in a vertical attitude or at an acute angle to the vertical plane;
2. partially leaching the ore;
3. removing said outer members by pulling them out upwardly so as to create a void directly between the ore and the said inner members, causing movement of ore filling said void and of nearby ore;
4. Continuing partial leaching of the ore;
5. removing said inner members by pulling them out upwardly, so as to create a second void in the ore, causing additional movement of ore filling said second void and of nearby ore; and
6. completing the leaching.

38. The method of extracting metals from ores by above-ground heap leaching, wherein during the leaching the crushed ore pieces are caused to shift slightly at least twice at chronologically separated points in time by providing void-creating members in the ore body to be leached and removing said members by pulling them out in two or more chronologically separated steps.

39. A method for the extraction of metals from ores by above ground leaching, comprising:
1. commencing the construction of an ore body by depositing on a leach pad a layer of crushed ore, said layer having a plurality of peaks or ridges separated by hollows;
2. placing upon said peaks or ridges a plurality of rigid sheets, each sheet being supported by at least two peaks or ridges, so as to create voids below said sheets wherein said sheets;
   a. cover at least a major area of said ore layer,
   b. have perforations permitting the leaching solution, but not the ore pieces, to pass through them,
   c. are strong enough to support the weight of the ore deposited thereon in completing the ore body, and
   d. are subject at least in part to corrosion by the leaching solution,
3. completing the construction of the ore body by depositing additional crushed ore on said sheets, and
4. leaching the ore, thereby, during the leaching, impairing the structural integrity of said sheets by the corrosive effect of the leaching solution to such an extent as to cause their breaking up under the weight of the ore, thus causing movement of the individual crushed ore pieces in filling said voids.

40. The method of claim 39 wherein the rigid perforated sheets comprise one or more materials, different parts of said sheets being subject to corrosion by the leaching solution at different rates.

41. A method for the extraction of metals from ores by above ground leaching, comprising:
1. providing on a leach pad or on an ore layer previously deposited on a leach pad, rigid sheets, said sheets resting on a plurality of spacing support members so as to create voids below said sheets, wherein said sheets:
   a. cover at least a major area of the leach pad
   b. have perforations permitting the leaching solution, but not crushed ore pieces of nominal size, to pass through them, and
   c. are strong enough to support the weight of the ore deposited thereon in completing the ore body, and wherein said support members;
   a. prior to leaching, are strong enough to support the weight of the ore deposited on the sheets in completing the ore body, and
   b. are subject at least in part to corrosion by the leaching solution;
2. completing the construction of the ore body by depositing crushed ore on said sheets; and
3. leaching the ore, wherein, during the leaching, the structural integrity of said support members is impaired by the corrosive effect of the leaching solution to such an extent as to cause their breaking up under the weight of the ore, causing movement of the ore in filling said voids.

* * * * *